United States Patent [19]

Thuries et al.

[11] 4,239,180
[45] Dec. 16, 1980

[54] COMPENSATED FORCE VALVE WITH TWO SEATS

[75] Inventors: Edmond Thuries, Pusignan; Bernard Raynaud, Caluire; Armand Scarato, Lyon, all of France

[73] Assignee: Delle-Alsthom, Villeurbanne, France

[21] Appl. No.: 10,282

[22] Filed: Feb. 7, 1979

[51] Int. Cl.³ .................................. F16K 31/122
[52] U.S. Cl. .................................. 251/51
[58] Field of Search ............... 251/48, 50, 51, 52, 251/53, 54, 55

[56] References Cited

U.S. PATENT DOCUMENTS

| 161,977 | 4/1875 | Moore | 251/51 |
| 374,188 | 12/1887 | Hurt | 251/52 |
| 820,598 | 5/1906 | Petersen | 251/50 |
| 1,466,412 | 8/1923 | Samain | 251/48 |
| 1,887,078 | 11/1932 | Wheaton | 251/48 |

FOREIGN PATENT DOCUMENTS 6345 of 1885 United Kingdom ............. 251/50

Primary Examiner—Martin P. Schwadron
Assistant Examiner—G. L. Walton
Attorney, Agent, or Firm—Sughrue, Rothwell, Mion, Zinn and Macpeak

[57] ABSTRACT

A valve for the escape of compressed air in order to extinguish the electric arc between the moving contacts of a circuit-breaker. The arrangement includes an intermediate moving structure between the control rod and the compensated force valve with two seats, said structure being constituted by a cylinder integral with one of the seats and a piston which cooperates with the control rod in order to transmit a rapid and reliable control command.

4 Claims, 3 Drawing Figures

COMPENSATED FORCE VALVE WITH TWO SEATS

FIELD OF THE INVENTION

The present invention relates to a compensated force valve with two seats, in particular a gas-blast valve for releasing compressed gas, such an operation being necessary for extinguishing the electric arc which is generated when a very high voltage circuit-breaker opens.

BACKGROUND OF THE INVENTION

Known gas-blast circuit-breakers such as illustrated in FIG. 1 include two arc-extinguishing chambers 1 and 2 connected together in series by a live central casing 3, the assembly being set on a ceramic insulating support 4 which rests on a base 5 which includes a supply of compressed gas. Each of the chambers includes contacts 6 and 7 between which the electric arc is generated when they open, a set of main valves 8 and an auxiliary valve 9. Rods 10 operate one of the valves 8 as well as the contacts 6 and 7 of the circuit-breaker; these rods are actuated from the ground by electrically operated valves.

It is known to use compensated force valves with two seats as gas-blast valves, said valves including two pistons integral with each other which are subject to a pressure difference allowing an operation which requires only a relatively small force.

However, earlier arrangements were designed to operate with control valves actuated by mechanical rods and release valves operated by gas-blast and required relatively large exhaust passages between the two valves. This disposition impairs the rapidity of the control means and it is known that to open a circuit-breaker, the valve must be controlled in the shortest time possible, approximately 30 milliseconds being prohibitive at very high voltages in conventional arrangements. Further, after operation, the return of the control means to a position which allows further operation must also be carried out in a fairly short time, this not being the case with conventional arrangements, which are also subjected to the forces generated by the expansion of the control rods and this affects the operation of the valve.

The valve in accordance with the present invention tends to remedy the above-mentioned drawbacks and groups together in a single arrangement the functions of both valves of the prior art. It reduces the activation time to 10 milliseconds. The return of the control means is also carried out in a very short time. The operation of the arrangement is independent of any expansion of the control rods. Lastly sufficient damping of the movement of the moving parts of the valve control means is provided.

SUMMARY OF THE INVENTION

The present invention provides a compensated force valve with two seats, said valve including a first piston and a second piston which are connected together by a common shaft, the upper portion of the first piston being acted on by a spring and by the compressed gas to be exhausted, the lower portion of the second piston being acted on by a compressed gas, and an externally actuated control rod acting on the valve for controlling said exhausting of compressed gas, the improvement comprising an intermediate moving structure which slides simultaneously relative to parts which are integral with the lower portion of said second piston and to components connected to said control rod.

According to one particularity of the invention said intermediate moving structure is constituted by a piston-cylinder assembly, said cylinder being integral with the lower portion of said second piston and with said piston which co-operates with a stop integral with said rod, the piston-cylinder assembly being returned by a spring.

BRIEF DESCRIPTION OF THE DRAWINGS

The invention will be better understood on examining the example given hereinbelow with reference to the accompanying drawings in which.

DETAILED DESCRIPTION

Figure 1:
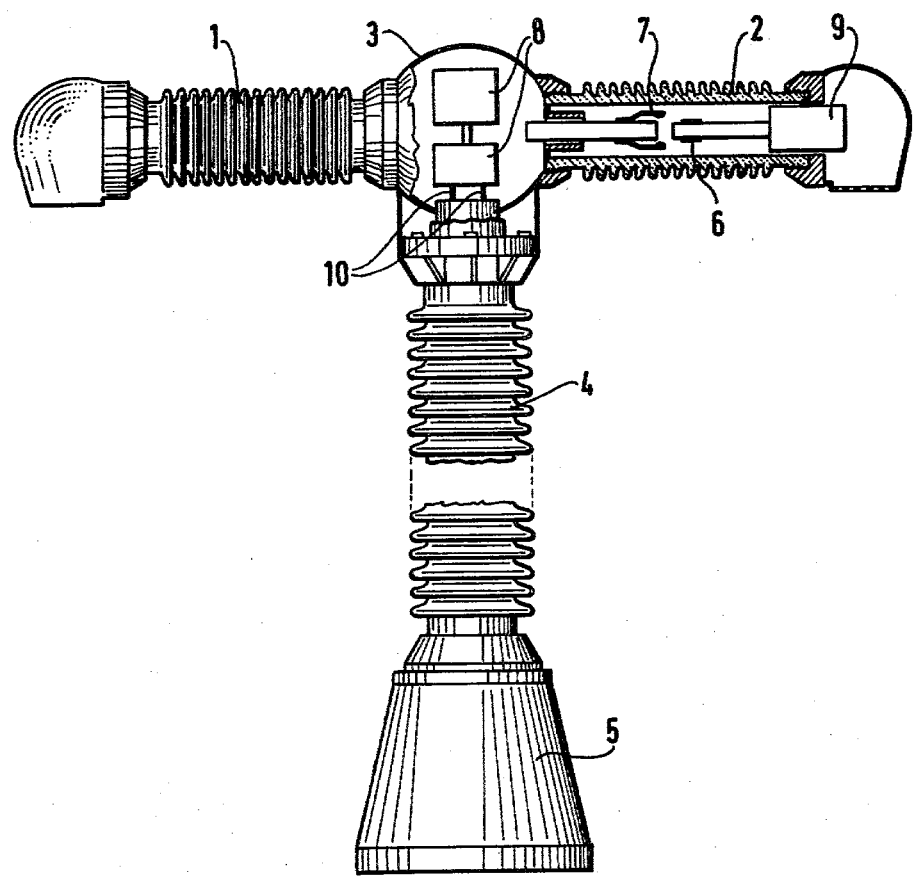
FIG. 1 illustrates schematically a circuit-breaker according to the prior art.
Figure 2:
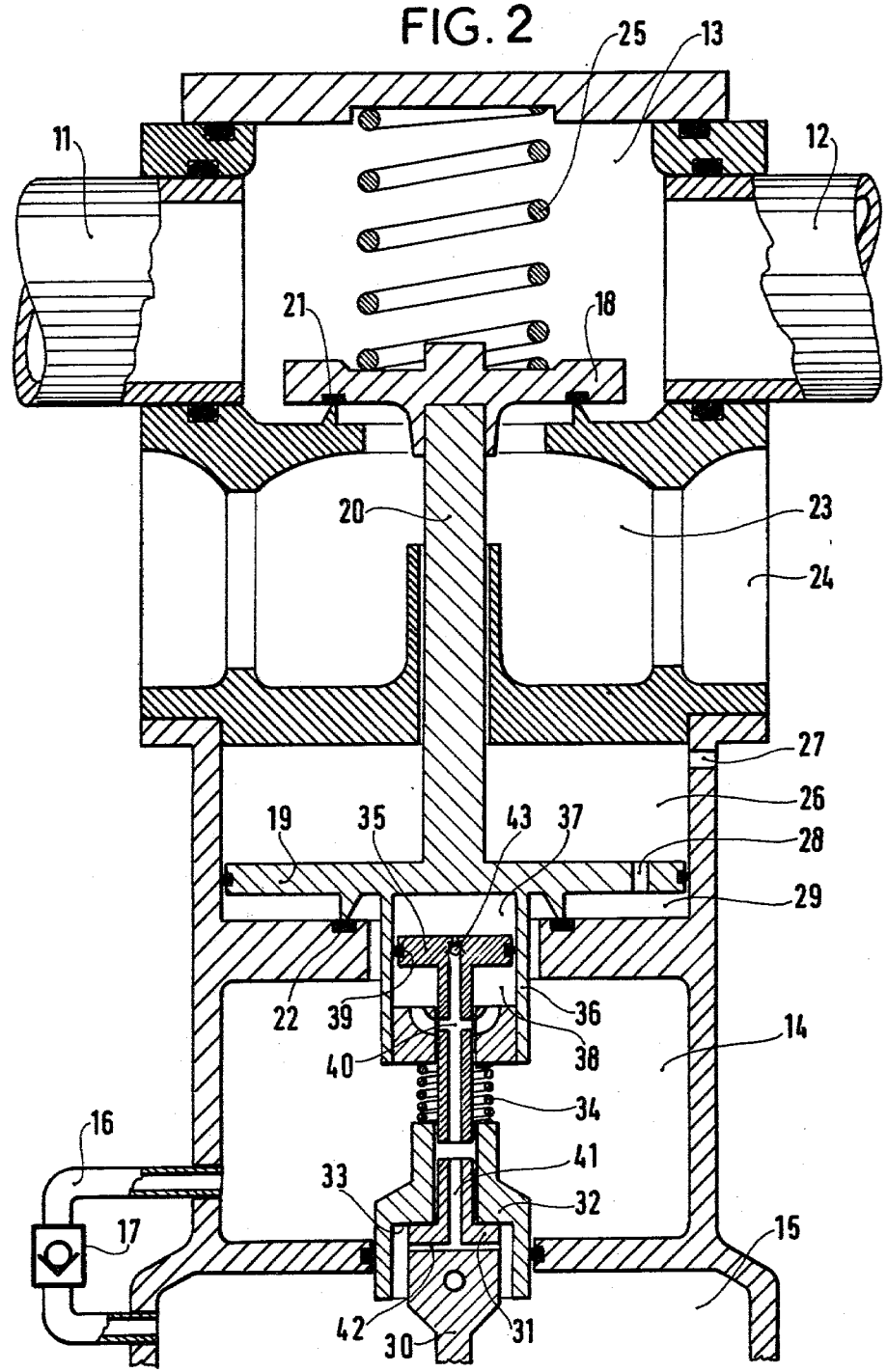
FIG. 2 is a cross-section along the axis of a main valve embodying the invention in its closed position.
Figure 3:
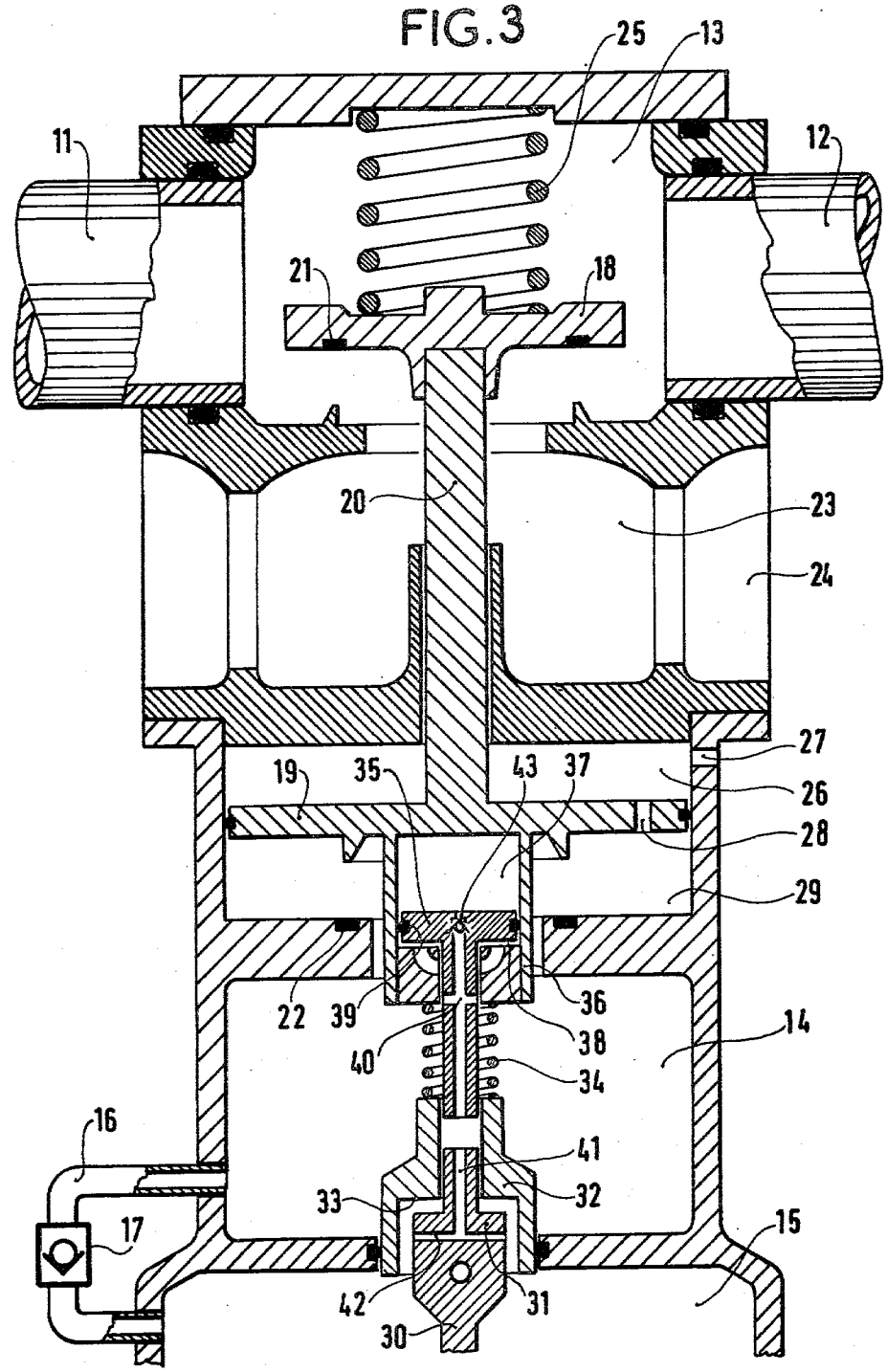
FIG. 3 is a cross-section of the main valve during its opening movement.

The main valve of the circuit-breaker such as shown in FIGS. 2 and 3 is disposed so that its axis coincides substantially with the vertical axis of the insulating support 4 shown in FIG. 1. The valve suddenly releases the compressed gas (e.g. air at a pressure of 40 bars) disposed in the circuit-breaker arc-extinguishing chambers to which it is connected by passages 11 and 12 of large cross-section. A chamber 13 in the upper part of the valve and which communicates with the two passages 11 and 12 is subjected to the same high pressure as the arc-extinguishing chambers when the valve is closed. In the lower part of the valve, a chamber 14 also contains a gas at the same high pressure. The high-pressure gas comes from a chamber 15 disposed beneath the valve, the chambers 14 and 15 being connected by a passage 16 which includes a non-return valve 17 which allows gas to pass from the chamber 15 to the chamber 14.

The compressed gas necessary for the operation of the circuit-breaker and of the valve is supplied by compressors disposed for example on the ground.

The valve includes two pistons 18 and 19 connected together by a common shaft 20 and, due to the opposing pressures exerted thereon, actually constitutes a compensated force valve with two seats. Annular seals such as 21 and 22 are disposed between the pistons 18 and 19 and their seats. A chamber 23 disposed under the piston 18 communicates with the atmosphere via deflectors disposed in the direction of the opening 24 and which allow the gas to exit when the valve opens. A spring 25 applies an initial pressure to the pistons 18 and 19 of the valve in order to seal them when the chambers 13 and 14 are at a lower pressure. A chamber 26 situated above the piston 19 communicates with the atmosphere via a passage 27. A calibrated bore 28 disposed in the piston 19 communicates between the chamber 26 and a chamber 29 situated below the piston 19.

A valve control rod is constituted by a bar 30 and a part 31 fixed on the bar 30. The part 31 slides freely in a sheath 32, and a shoulder 33 of the part 31 acts as support for the sheath 32. A compression spring 34 whose function is described below normally holds the sheath 32 against the shoulder 33.

An intermediate moving structure constituted by a piston 35 integral with the sheath 32 and by a cylinder 36 integral with the valve piston 19 slides in relation to the valve and to the control rod. The piston 35 divides the cylinder 36 into two chambers 37 and 38. Suitably calibrated sealing is provided between the chambers 37 and 38 for example by a ring seal 39. The chambers 37 and 38 communicate via a central passage 40 of the piston 35, a central passage 41 in the part 31 and a radial passage 42 with the high-pressure chamber 15. A non-return valve 43 disposed in the passage 40 of the piston 35 allows a one-way flow from the chamber 15 or the chamber 38 to the chamber 37.

The spring 34 also generates a pre-stress in the control linkage and by cancelling any possible play, it accelerates the transmission of the commands which control the movement of the valve.

The ring seal 39 provides excellent sealing against dynamic pressure which lasts for a very short time but poor sealing against static pressure in the chambers 37 and 38 which lasts for a longer time. Sealing is such that leakage at the ring seal 39 is practically negligible for periods of the order of the valve operate time, i.e. periods which lie between a fraction of a millisecond and milliseconds. In contrast, leakage is high for periods of the order of the return time of the control means to its rest position and *a fortiori* for longer periods, for example periods equal to or longer than a tenth of a second.

The arrangement operates as follows. Under the effect of the control rods, the upward movement of the bar 30, of the part 31 and of its shoulder 33 pushes the parts of the intermediate moving structure which are constituted by the sheath 32 and the piston 35, compressing the spring 34. Since the chamber 37 is closed by the non-return valve 43, the rapid movement of the piston 35 which compresses the gas situated in the chamber 37 causes the dynamic rise of the valve with two pistons 18, 19 and simultaneously damps the movement of the moving parts, thus avoiding shock on the valve.

As the pressure rises in the chamber 37, the valve with two pistons 18, 19 tends to move faster than the bar 30 and the part 41 which becomes separated from the sheath 32. The acceleration of the valve frees its movement from the inertia of the control linkage situated below the bar 30.

The response time of the control means is very substantially shortened at the beginning of the operation for two reasons, namely: the cancellation of play and the acceleration of the transmission of the operate command and, at the end of the stroke, due to the fact that the valve movement is free from the inertia of the linkage.

When the valve is completely open, the gases under pressure in the chamber 13 exit outwards via the chamber 23 and the deflectors 24 thereby enabling the arc between the contacts of the circuit-breaker to be extinguished. Simultaneously the pressure in the chambers 37 and 38 tend to equilibrium due to the leakage at the ring seal 39. The spring 34 brings the sheath 32 back against the shoulder 33 of the part 31. This operation takes place rapidly since the valve 43 allows the gases to pass from the chamber 38 to the chamber 37. Under the effect of the spring 25 whose force is then greater than the residual differential pressure on the valve with two pistons 18, 19, the valve closes. The chamber 14 is again supplied with gas at high pressure via the non-return valve 17 and the chamber 13 is again supplied with gas by piping which is not shown. The control means is then ready to receive another operate command.

Variations in temperature cause different thermal expansions of the control linkage and of the stationary parts, since those components are made of materials which have different coefficients of expansion. The difference in expansion of the linkage is compensated by the movement of the piston 35 in the cylinder 36. Since temperature variations are relatively slow, the movements will be slow and the then high leakage at the ring seal 39 allows a natural balance of the pressure in the chambers 37 and 38. The adjustment of the arrangement is fool-proof whatever the variations in temperature may be.

The advantages of the arrangement in accordance with the invention are as follows: it allows very rapid control of compensated force valves with two seats for two reasons: at the beginning of operation, the cancellation of play and the prestress in the control linkage due to the spring 34 accelerate the transmission of operate commands; after a certain stroke of the valve, the effect of the pressure in the chamber 37 separates the part 31 from the sheath 32 and accelerates the movement of the valve with two pistons 18, 19, freeing them from the inertia of the linkages.

The difference in thermal expansion between the linkage and the stationary parts is compensated in a fool-proof manner by the movement of the piston 35 in a cylinder, the calibrated sealing of the ring seals 39, the spring 34 and the valve 43 provide, after operation, rapid return of the control means to a position which allows further operation, the existence of pressure in the chamber 37 prevents shock and damps the movement of the moving parts when the valve opens rapidly.

We claim:

1. A compensated force valve with two seats, said valve including a first piston and second piston which are connected together by a common shaft, means for mounting said pistons within said valve so as to move commonly toward and away from respective underlying seats, the upper face of the first piston being acted on by a spring and by the compressed gas to be exhausted, the lower face of the second piston being acted on by a compressed gas, and an externally actuated control rod acting on the valve for controlling said exhausting of compressed gas, the improvement comprising an intermediate moving structure interposed between said control rod and said second piston, said intermediate moving structure being constituted by a piston-cylinder assembly including a control cylinder and a control piston slidable therein, said control cylinder being integral with said second piston and operatively contacting a stop integral with said control rod and a compression spring biasing the piston-cylinder assembly to return position relative to said rod, whereby there is reduced valve actuating time and reduced control return time with the intermediate moving structure providing improved dampening of the moving parts of said compensated force valve.

2. A valve according to claim 1, wherein said piston and the cylinder are provided with a calibrated ring seal such that the leakage therebetween is negligible for dynamic pressures which last for a short time and is high for static pressures which last for a long time.

3. A valve according to claim 1, wherein the chambers situated to each side of the control piston of said intermediate moving structure communicate via an axial passage with a pressure source, said axial passage including a valve which allows one-way communication of said pressure source towards said chamber situated to the side of the control piston facing said second piston.

4. A valve according to claim 1, wherein the rod of said control piston projects internally of a sheath which abuts against said stop of said control rod when the valve closes and when the valve begins to open, when the control piston compresses the gas in the chamber of the cylinder and moves at the same time as the control rod and which moves away from the stop at the end of the opening of the valve when the latter moves at a higher speed than the control rod.

* * * * *